UNITED STATES PATENT OFFICE.

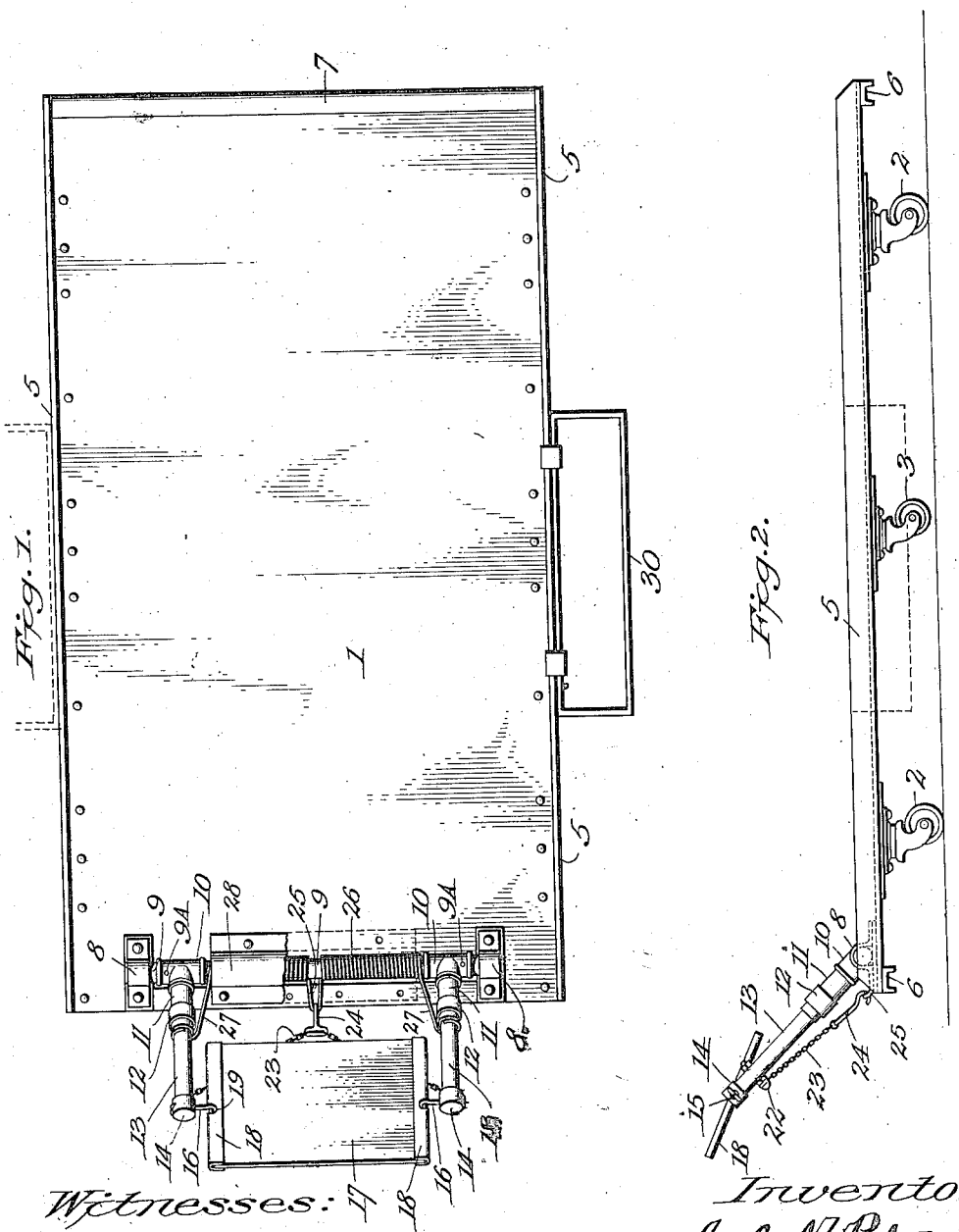

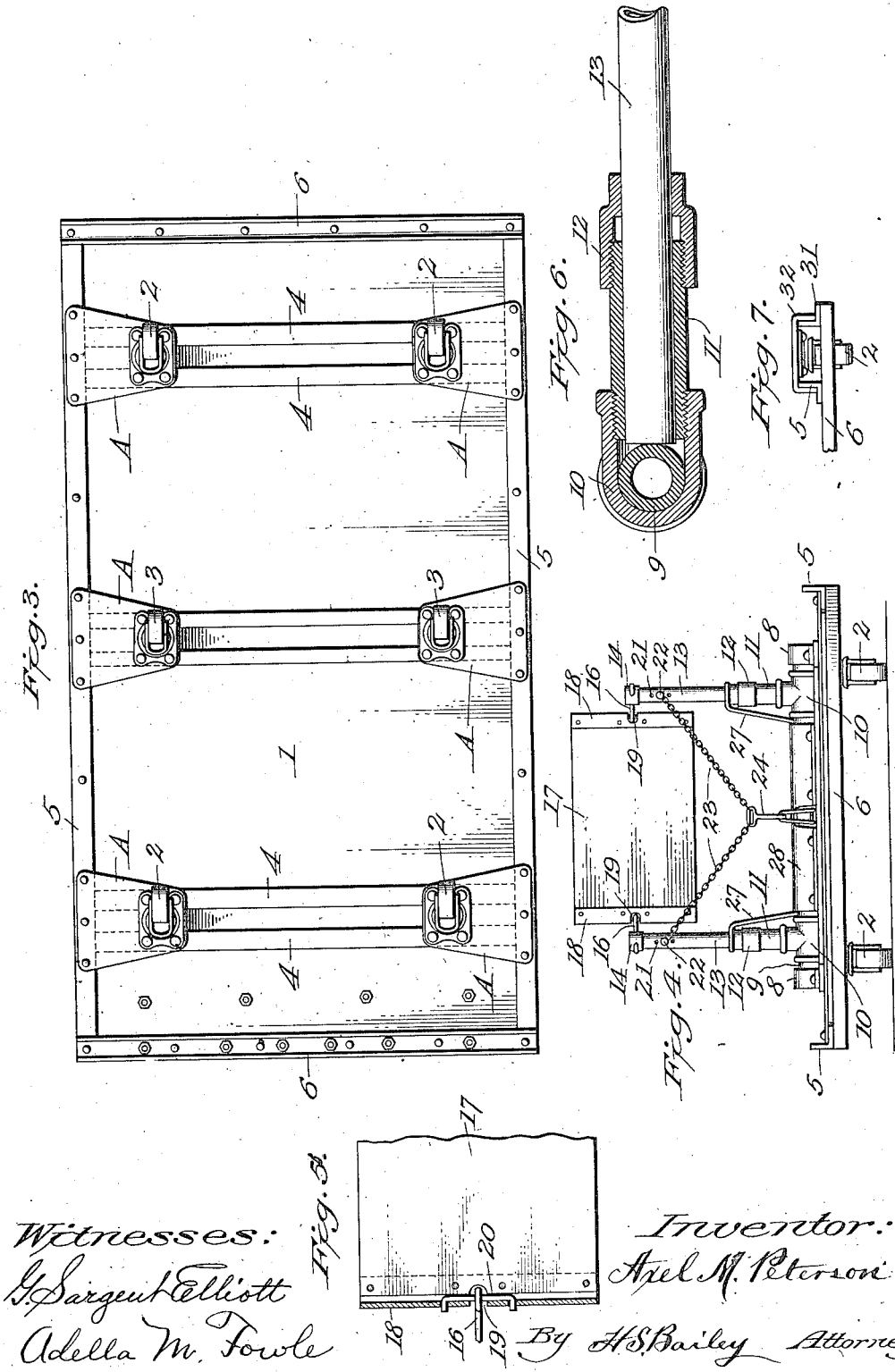

AXEL M. PETERSON, OF EDGEWATER, COLORADO, ASSIGNOR OF ONE-HALF TO ANNA A. RENFROW, OF DENVER, COLORADO.

AUTOMOBILE REPAIR-CREEPER.

1,184,487.   Specification of Letters Patent.   Patented May 23, 1916.

Application filed March 27, 1915. Serial No. 17,400.

*To all whom it may concern:*

Be it known that I, AXEL M. PETERSON, a citizen of the United States of America, residing at Edgewater, county of Jefferson, and State of Colorado, have invented a new and useful Automobile Repair-Creeper, of which the following is a specification.

My invention relates to improvements in automobile repair creepers; and the objects of my invention are, first, to provide an automobile repair creeper that is provided with a resiliently yielding and cushioning head rest that will enable the operator to automatically adjust his head to all practical high or low positions to best see the parts of the automobile he is working on, and second, to provide an adjustable spring controlled head rest repair creeper for automobiles that will fold over and rest under resilient pressure against the top surface of the platform when not in use, and that can be adjusted to move through swinging arcs of different radii to suit the head of the operator. I attain these objects by the mechanism illustrated in the accompanying drawings, in which:

Figure 1, is a plan view of the creeper. Fig. 2, is a side view. Fig. 3, is a bottom plan view. Fig. 4, is a front end view, showing the head rest and its supporting arms standing at right angles to the platform instead of at an inclination, in order to more clearly show their construction and arrangement. Fig. 5, is a plan view partly in section, of one end of the head rest. Fig. 6, is an enlarged sectional view of one of the head rest supporting arms, and its connection with the supporting shaft. And Fig. 7, is a view of one corner of the creeper, showing a modification in the arrangement of the caster wheels.

Similar letters of reference refer to similar parts throughout the several views.

Referring to the drawings,—The numeral 1, designates the platform on which the automobile repairing man lies upon his back. This platform is preferably made of sheet steel or any other suitable metal, but if desired it may be made of wood or any other suitable material. Upon the bottom of this platform near its opposite end portions, I secure pivotally rotating casters 2. These casters are preferably secured to plates A, the inner ends of which are secured to cross braces 4, that extend across the width of the platform, and their outer ends are secured to longitudinal angle bars 5, that extend along the side edges of the platform and with the cross braces act to truss the platform and stiffen it. The opposite bottom edges of this platform are each stiffened and trussed by bars 6 of channel iron, which are secured to the bottom of the platform. The opposite side edges of the platform are riveted or otherwise secured to the angle bars 5, and the rear edge is provided with a half round iron trussing bar 7. Thus trussed, the metal platform of my creeper is strong enough to support the weight of the body of a man. The creeper platform is however apt to sag down under the weight of a person, and to prevent its sagging down too far or enough to bend it, I place midway between the casters 2 a pair of pivotally turning casters 3, enough smaller than those at the opposite ends of the platform to allow the platform to sag under the weight of the repairer until these smaller casters rest on the floor of the garage when the center of the platform is supported against a permanent bend or sag in its center.

The head end portion of my improved creeper is provided with an automatically adjustable resiliently cushioned head rest, which I preferably construct in the following manner, although my invention contemplates any mechanism that will provide an automatically head raising and lowering resiliently cushioning head rest: To the top surface of the platform near its adjacent opposite sides, I secure bearing boxes 8, in which the opposite ends of a shaft 9 are rotatably mounted. This shaft is preferably made of a piece of tubing to make the shaft as light of weight as possible. On this shaft adjacent to the boxes, I mount and secure by any suitable means, preferably by pins 9$^A$, T-fittings 10, to each of which is threaded a nipple 11. The large end of a reducer 12 is threaded to each nipple, the threads being reamed out of their smaller ends, and through the small end of each reducer a piece of tubing 13, is inserted and driven through the nipple 11, until it abuts against the shaft 9, as shown by Fig. 6, thus providing a thoroughly braced arm. These tubes 13 extend several inches from the reducer, and to the end of each a cap 14 is threaded. The caps 14 stand at an equal and predetermined distance from the shaft 9, and transversely through their central portions apertures 15 are formed, in which pins 16 are placed. These pins are preferably split pins, and their ends are bent in opposite directions on the outside of the caps. The pins 16 support a head rest 17, in the form of a strip of suitable flexible material, the ends of which are secured between metal plates 18, which are folded over them, and fastened thereto by rivets, as shown most clearly in Figs. 1 and 5. The folded edges of the metal plates are recessed, as shown at 19, to receive the eyed ends of the pins 16, and through the eyes of the pins are passed rods 20, which lie in the folded end of the metal plates 18, the ends of the rod 20 being bent at right angles and projected through holes in the folded edges of the plates to prevent the rods from becoming displaced.

I preferably use for the head rest a piece of soft rubber belting about four inches wide and six to seven inches long. Below the cap 14, each tube 13 is provided with a row of apertures 21, and in one hole of each tube a small bolt 22 is placed, to which the opposite ends of a chain 23 are secured. The center of this chain is provided with a hook 24, and it is adapted to be connected to a loop 25, that is formed in the center of a right and left hand coiled spring 26, that is placed on the shaft 9.

The head rest part of my creeper is designed to stand when in use at an upwardly projecting oblique angle above the top surface of the platform, and when in that position it is designed to be under resilient tension that will enable the head of the operator to press it backward and downward from the highest position the chain will let it rise to, to close to a horizontal position along level with the surface of the platform. Consequently the adjustable chain defines the upward resilient movement of the head rest band and its frame, and the resilient tension the head rest frame is under will hold the operator's head up above the horizontal line of his body so that he can see along the bottom of the car in the direction of his body, and at all upward angles above his body, and if he desires to look directly above his head and face he exerts pressure against the band with his head and it will yieldingly move downward until he can look straight upward and at a slight angular direction backward of his head, the resilient tension of the springs being such as will allow the band and its frame to support the head in a comfortable position throughout the range of its reciprocal arc movement.

My invention contemplates any kind of a resilient cushioning movement of my head rest through any predetermined practical range of reciprocal movement for the head of an operator being on his back on the creeper platform; and while there are a number of ways of carrying out this feature of my invention, I preferably employ the following: Upon the shaft 9 between the T fittings I loosely mount a right hand wound and a left hand wound coil spring which is preferably wound out of a single piece of unbroken wire. These coils are of equal length and centrally between them the loop 25 is formed in the wire, and this loop is extended out to the end of the platform and is arranged to rest flat against its surface in order that it may form an anchor for the two coils with which it forms an integral part. The opposite outer ends 27 of these two spring coils are each made long enough to extend to and be twisted around the small tubes 13 close to the reducer of each tube. The tension of these springs and their arrangement on the shaft and around the tubes 13 is such that the springs normally hold the head rest frame and its head rest band down flat against the surface of the platform and pointing away from the head end of it, and when it is to be used, the operator swings it upwardly and over beyond its vertical center far enough to enable him to hook the hook of the chain into the loop 25 of the coiled springs, when it will stand in operative position to receive the head of the operator.

Over the coiled springs I preferably place a guard casing 28, which is removably secured to the platform and is adapted to prevent the oil and dirt of the springs from getting onto the operator. Along the sides of the platform I place tool holding boxes 30, which may be of any predetermined size.

If desired, the platform can be supported at a lower plane than is shown in Figs. 1 and 2, in order to give more room to the person using the same beneath an automobile. This may be accomplished by lengthening the angle bars 6, at the opposite ends of the platform, to extend a suitable distance beyond the side angle bars 5, in order to support additional angle bars 31, which are parallel with the angle bars 5, as will be understood by reference to Fig. 7. A metal plate 32 is supported upon and secured to the angle bars 5 and 31, at the respective corners of the platform, and the casters 2 are secured to the said plates 32, as shown.

The operation of my improved automatically adjustable head rest automobile repair creeper, is as follows: The operator or workman first erects the head rest by swinging it up and hooking it to loop 25. He then lies down on his back with his head resting in the pliable bend of the head rest. Then with his hands and feet he pulls and pushes to cause the platform to roll under the automobile to be repaired, when having tools handy in the tool boxes at his sides he can effect the repairs needed, and is able to raise or lower his head to see at all angles around him, and he can automatically change the position of his head to positions where he can best see the parts be is working on.

My invention provides a thoroughly practical and strong creeper for automobile repair work, and while I have illustrated and described the preferred construction and arrangement of my invention, I do not wish to be limited to it, as many changes might be made without departing from the spirit of my invention.

Having described my invention, what I claim as new and desire to secure by Letters Patent, is:

1. In an automobile repair creeper, the combination of the roller platform and an adjustable head supporting rest, comprising a journaled shaft, projecting members at each end thereof supporting between them a head rest member, an adjustable chain connected at its ends to said projecting members, a coiled spring on said shaft secured at its opposite ends to said projecting members and arranged with a hook receiving loop at its central portion and a hook on said chain arranged to be hooked to said loop to hold said head rest in operative head receiving position, the engagement of said loop with said platform preventing the turning of said spring.

2. In a repair creeper of the character described, the combination with a platform having supporting casters, of a shaft mounted at one end of said platform, arms extending at right angles to said shaft and connected therewith, a flexible head rest supported by said arms, a spring encircling said shaft comprising right and left coils terminating at their junction in a loop, the ends of said coils being secured to said arms, and a chain connected at its ends to said arms and having a central hook which engages said loop, the engagement of said loop with said platform preventing the turning of said spring.

In testimony whereof I affix my signature in presence of two witnesses.

AXEL M. PETERSON.

Witnesses:
G. SARGENT ELLIOTT,
ADELLA M. FOWLE.